(12) United States Patent
Liao

(10) Patent No.: US 10,656,438 B2
(45) Date of Patent: *May 19, 2020

(54) SMART CONTACT LENS AND LIGHT-TRANSMITTING BODY THEREOF

(71) Applicant: MATAVIEW PHOTOLOGY CO. LTD., Taichung (TW)

(72) Inventor: Chien-Shou Liao, New Taipei (TW)

(73) Assignee: MATAVIEW PHOTOLOGY CO. LTD., Taichung (TW)

( * ) Notice: Subject to any disclaimer, the term of this patent is extended or adjusted under 35 U.S.C. 154(b) by 233 days.

This patent is subject to a terminal disclaimer.

(21) Appl. No.: 15/866,593

(22) Filed: Jan. 10, 2018

(65) Prior Publication Data

US 2019/0025609 A1 Jan. 24, 2019

(30) Foreign Application Priority Data

Jul. 24, 2017 (TW) ................................ 106124738

(51) Int. Cl.
*G02C 7/02* (2006.01)
*G02C 7/04* (2006.01)
(Continued)

(52) U.S. Cl.
CPC ............. *G02C 7/049* (2013.01); *G02B 1/043* (2013.01); *G02C 7/04* (2013.01); *B29D 11/00807* (2013.01)

(58) Field of Classification Search
CPC .......... G02C 7/049; G02C 7/04; G02C 7/041; G02C 7/042; G02C 7/081; G02C 7/083;
(Continued)

(56) References Cited

U.S. PATENT DOCUMENTS

2012/0140167 A1 6/2012 Blum
2016/0062150 A1* 3/2016 Sako ...................... G02C 7/04
351/158

(Continued)

FOREIGN PATENT DOCUMENTS

TW I531178 B 4/2016

*Primary Examiner* — William R Alexander
*Assistant Examiner* — Henry A Duong
(74) *Attorney, Agent, or Firm* — Li & Cai Intellectual Property (USA) Office

(57) ABSTRACT

The present disclosure provides a smart contact lens and a light-transmitting body thereof. The smart contact lens includes a light-transmitting body, an image-sensing module and an image display module. The light-transmitting body has a first view window and a second view window. The image-sensing module diverges from the second view window by a predetermined horizontal distance. The image display module diverges from the first view window by a predetermined horizontal distance. The light-transmitting body has a first transmission path formed between the second view window and the image-sensing module, and a second transmission path formed between the first view window and the image display module. An external image source received by the second view window is transmitted to the image-sensing module through the first transmission path, and an internal image source generated by the image display module is transmitted to an eyeball through the second transmission path.

10 Claims, 16 Drawing Sheets

(51) Int. Cl.
*G02B 1/04* (2006.01)
*B29D 11/00* (2006.01)

(58) Field of Classification Search
CPC ...... G02C 7/10; G02C 7/101; G02C 2202/12; G02C 2202/14; G02B 1/043; B29D 11/00807
USPC .................................................. 351/159.03
See application file for complete search history.

(56) References Cited

U.S. PATENT DOCUMENTS

2016/0310050 A1* 10/2016 Pepin ................. A61B 5/14532
2018/0224669 A1*  8/2018 Shtukater ................. G02C 7/04

* cited by examiner

SMART CONTACT LENS AND LIGHT-TRANSMITTING BODY THEREOF

FIELD OF THE INVENTION

The present disclosure relates to a smart contact lens and a light-transmitting body thereof, and more particularly to a smart contact lens having an image-capturing function and an image displaying function, and a light-transmitting body thereof.

BACKGROUND OF THE INVENTION

Contact lenses have been a popular alternative to glasses since being invented in the 1970s. Since improved manufacturing methods have lowered the production costs and many consider their appearance to be more attractive with contact lenses than with glasses, the popularity of contact lenses has surged. With the change in life style, there is an increasing demand for disposable contact lenses. While growing number of people have turned to disposable contact lenses because they are cheap and require no maintenance, there is still room for improvement in the art.

SUMMARY OF THE INVENTION

One aspect of the present disclosure relates to a smart contact lens and a light-transmitting body thereof.

One of the embodiments of the present disclosure provides a smart contact lens, including a light-transmitting body, a control module, an image-sensing module, an image display module, a wireless transmission module, a bio-sensing module and a power supply module. The light-transmitting body has a first view window and a second view window surrounding the first view window. The control module is received inside the light-transmitting body. The image-sensing module includes a plurality of image-sensing chips received inside the light-transmitting body and electrically connected to the control module, and the image-sensing chip diverges from the second view window by a first predetermined horizontal distance. The image display module includes a plurality of image display chips received inside the light-transmitting body and electrically connected to the control module, and the image display chip diverges from the first view window by a second predetermined horizontal distance. The wireless transmission module is received inside the light-transmitting body and electrically connected to the control module. The bio-sensing module includes at least one bio sensor chip received inside the light-transmitting body and electrically connected to the control module. The power supply module is received inside the light-transmitting body and electrically connected to the control module. More particularly, the light-transmitting body has a first transmission path and a second transmission path, the first transmission path is formed in the light-transmitting body and between the second view window and the image-sensing module, the second transmission path is formed in the light-transmitting body and between the first view window and the image display module, and an external image source is transmitted to the light-transmitting body through the first view window and the second view window, respectively. The external image source that has been received by the first view window directly passes through the light-transmitting body and then is projected onto an eyeball, and the external image source that has been received by the second view window is transmitted to the image-sensing chips of the image-sensing module through the first transmission path, and an internal image source generated by cooperation of the image display chips of the image display module is transmitted to the eyeball through the second transmission path.

Another one of the embodiments of the present disclosure provides a light-transmitting body for totally enclosing one of the control module, the image-sensing module, the image display module, the wireless transmission module, the bio-sensing module, and the power supply module. The light-transmitting body has a first view window and a second view window surrounding the first view window, and an external image source that has been received by the first view window directly passes through the light-transmitting body and then is projected onto an eyeball. The light-transmitting body has a first light-transmitting portion connected to the first view window, a second light-transmitting portion surroundingly connected to the first light-transmitting portion, a third light-transmitting portion connected to the second view window and surroundingly connected to the second light-transmitting portion, and a fourth light-transmitting portion surroundingly connected to the third light-transmitting portion.

Yet another one of the embodiments of the present disclosure provides a smart contact lens, including a light-transmitting body, a control module, an image-sensing module, an image display module, a wireless transmission module, a bio-sensing module and a power supply module. The light-transmitting body has a first view window and a second view window. The control module is received inside the light-transmitting body. The image-sensing module is received inside the light-transmitting body and electrically connected to the control module, and the image-sensing module diverges from the second view window by a first predetermined horizontal distance. The image display module is received inside the light-transmitting body and electrically connected to the control module, and the image display module diverges from the first view window by a second predetermined horizontal distance. The wireless transmission module is received inside the light-transmitting body and electrically connected to the control module. The bio-sensing module is received inside the light-transmitting body and electrically connected to the control module. The power supply module is received inside the light-transmitting body and electrically connected to the control module. More particularly, the light-transmitting body has a first transmission path and a second transmission path, the first transmission path is formed in the light-transmitting body and between the second view window and the image-sensing module, and the second transmission path is formed in the light-transmitting body and between the first view window and the image display module. An external image source that has been received by the second view window is transmitted to the image-sensing module through the first transmission path, and an internal image source generated by the image display module is transmitted to an eyeball through the second transmission path.

Therefore, the external image source that has been received by the second view window can be transmitted to the image-sensing module through the first transmission path, and the internal image source generated by the image display module can be transmitted to an eyeball through the second transmission path by matching the features of "the light-transmitting body has a first view window and a second view window" and "the light-transmitting body has a first transmission path formed between the second view window and the image-sensing module, and a second transmission path formed between the first view window and the image display module".

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a smart contact lens and a light-transmitting body thereof according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

First Embodiment

Figure 1:
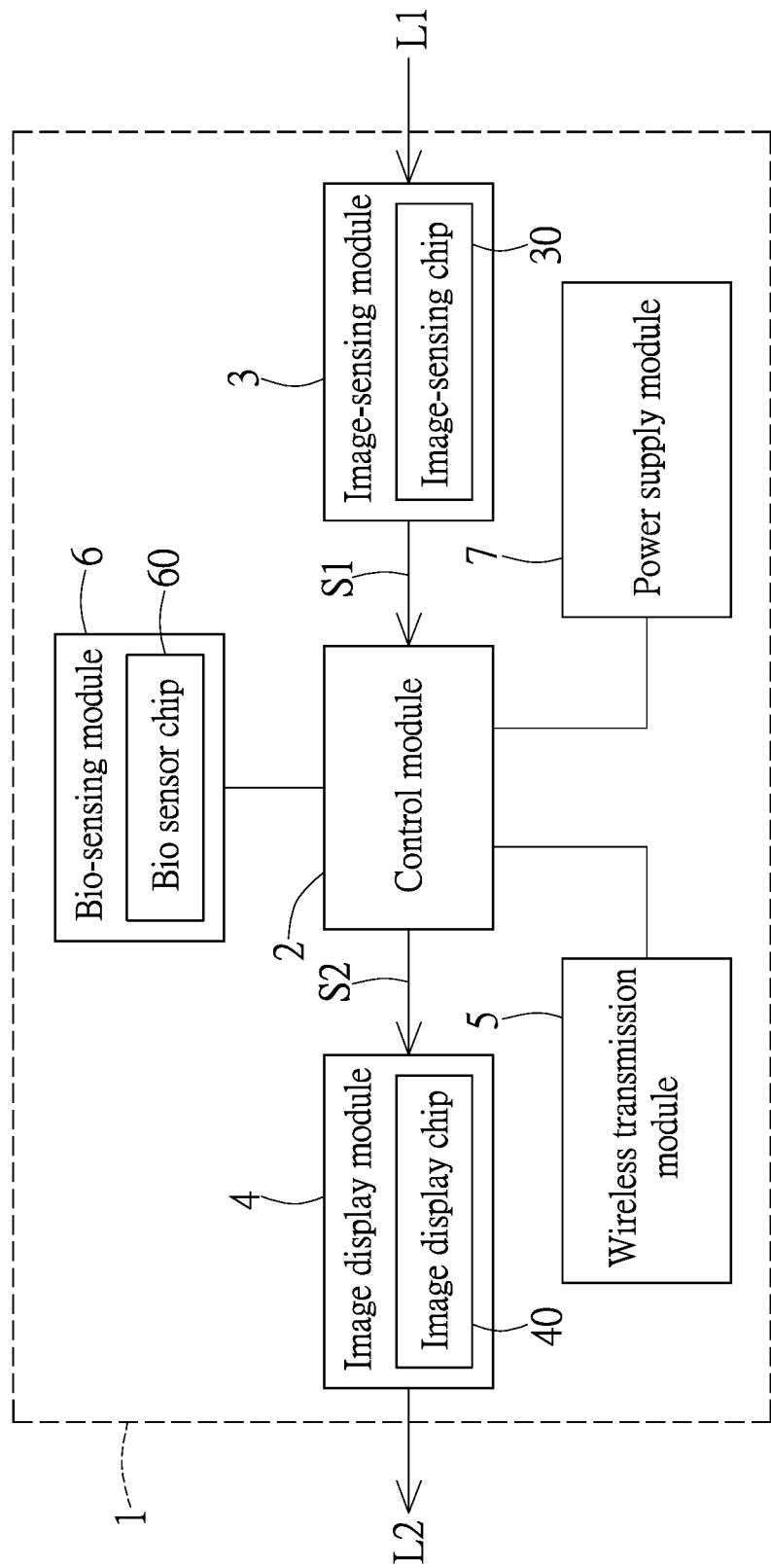
FIG. 1 shows a function block diagram of a smart contact lens according to the present disclosure.
Figure 2:
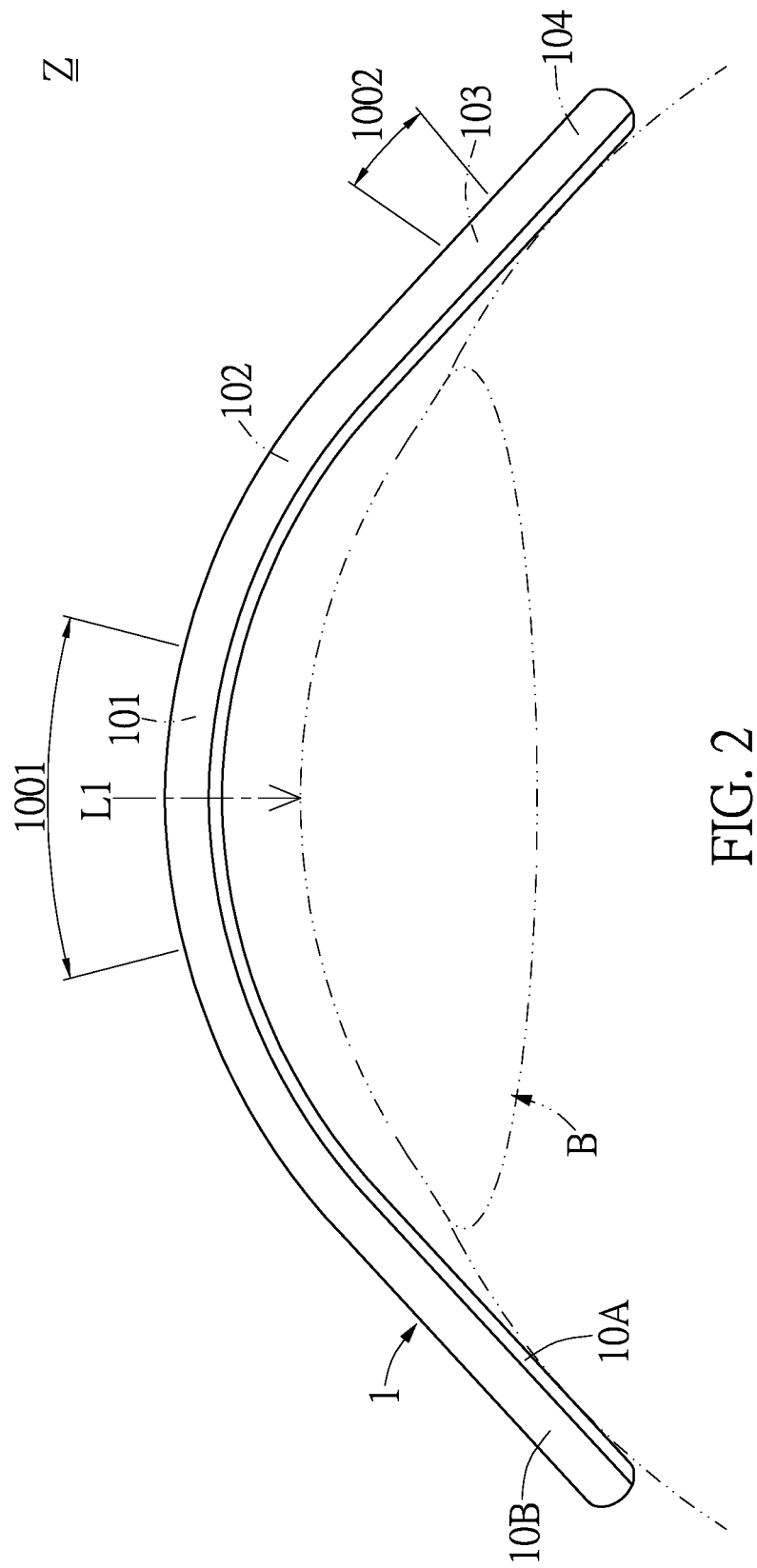
FIG. 2 shows a front schematic view of a light-transmitting body according to a first embodiment of the present disclosure.
Figure 3:
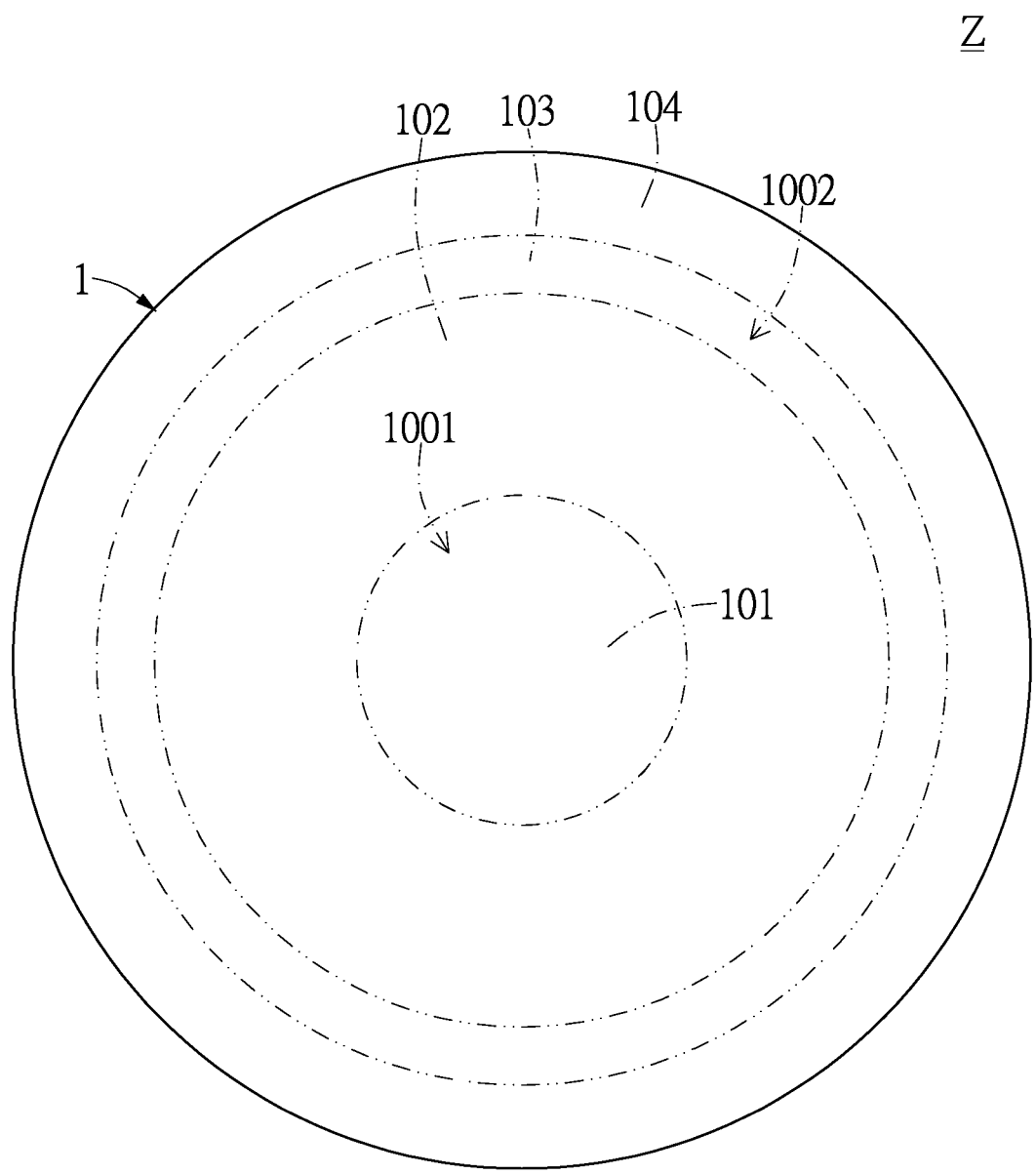
FIG. 3 shows a top schematic view of the light-transmitting body according to the first embodiment of the present disclosure.
Figure 4:
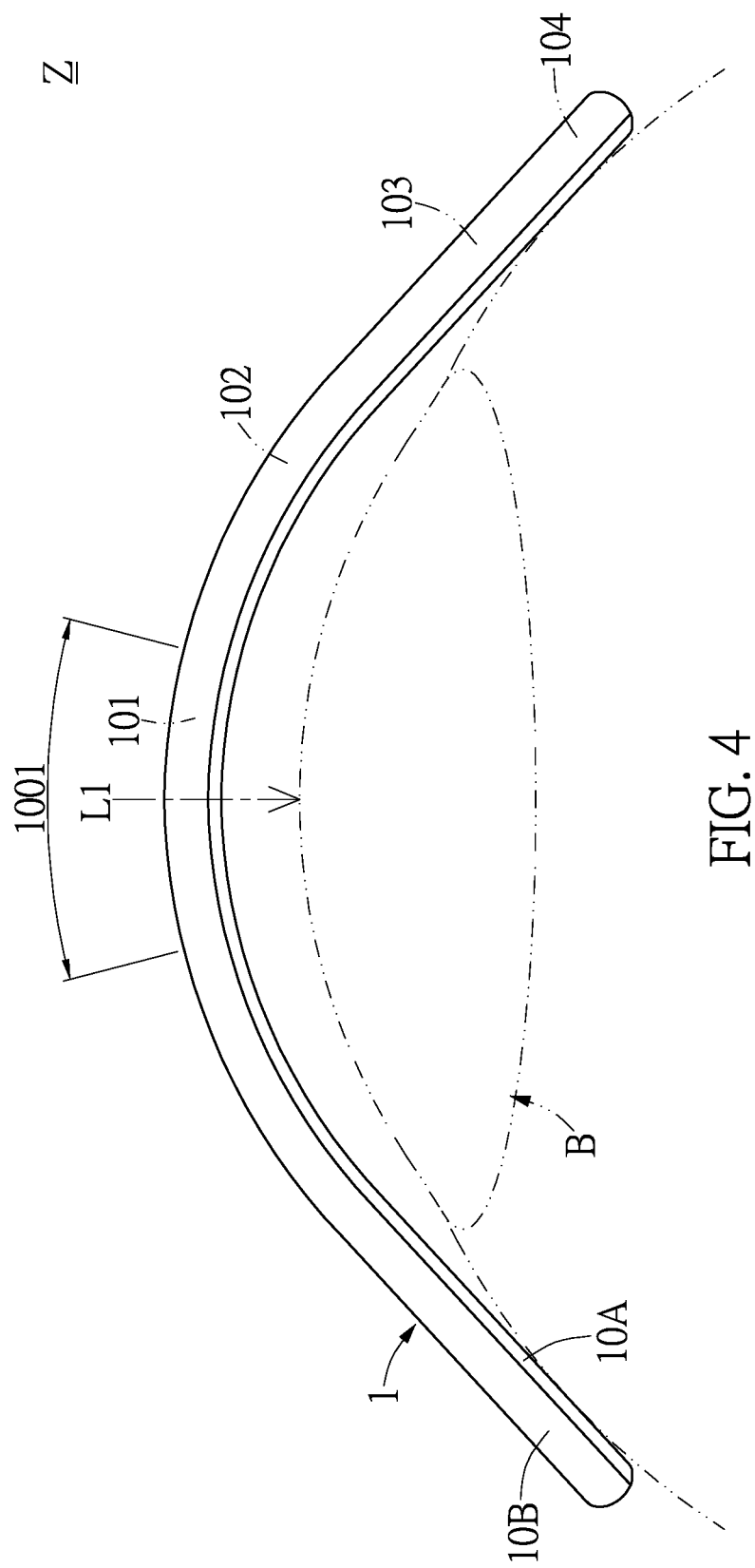
FIG. 4 shows a front schematic view of another light-transmitting body according to the first embodiment of the present disclosure.

Referring to FIG. 1 to FIG. 3, the first embodiment of the present disclosure provides a light-transmitting body 1 for totally enclosing one of the control module 2, the image-sensing module 3, the image display module 4, the wireless transmission module 5, the bio-sensing module 6, and the power supply module 7.

More particularly, referring to FIG. 2 and FIG. 3, the light-transmitting body 1 has a first view window 1001 and a second view window 1002 surrounding the first view window 1001, and an external image source L1 that has been received by the first view window 1001 can directly pass through the light-transmitting body 1 and then be projected onto an eyeball B. In addition, the light-transmitting body 1 has a first light-transmitting portion 101 connected to the first view window 1001, a second light-transmitting portion 102 surroundingly connected to the first light-transmitting portion 101, a third light-transmitting portion 103 connected to the second view window 1002 and surroundingly connected to the second light-transmitting portion 102, and a fourth light-transmitting portion 104 surroundingly connected to the third light-transmitting portion 103. It should be noted that both the first view window 1001 and the second view window 1002 (i.e., the two outer surfaces) of the light-transmitting body 1 are light-transmitting areas to allow the external image source L1 to pass therethrough, and the other outer surface of the light-transmitting body 1 is an opaque area.

For example, both the first view window 1001 and the second view window 1002 have an optical microstructure or an optical material layer disposed thereon so as to allow the external image source L1 to smoothly pass the first view window 1001 and the second view window 1002 and enter the light-transmitting body 1. In addition, the light-transmitting body 1 further includes a first light-transmitting layer 10A and a second light-transmitting layer 10B. The first light-transmitting layer 10A is attached to the eyeball B, and the second light-transmitting layer 10B is disposed on the first light-transmitting layer 10A. Moreover, one of the control module 2, the image-sensing module 3, the image display module 4, the wireless transmission module 5, the bio-sensing module 6, and the power supply module 7 can be totally enclosed between the first light-transmitting layer 10A and the second light-transmitting layer 10B, and both the first view window 1001 and the second view window 1002 are disposed on the second light-transmitting layer 10B. Furthermore, the wireless transmission module 5 may be a circuit layout having a predetermined pattern. However, it is merely an example and is not meant to limit the scope of the present disclosure.

It should be noted that the second view window 1002 can be omitted from the light-transmitting body 1 of the first embodiment, and the first view window 1001 can be the only one used as shown in FIG. 2.

Second Embodiment

Figure 5:
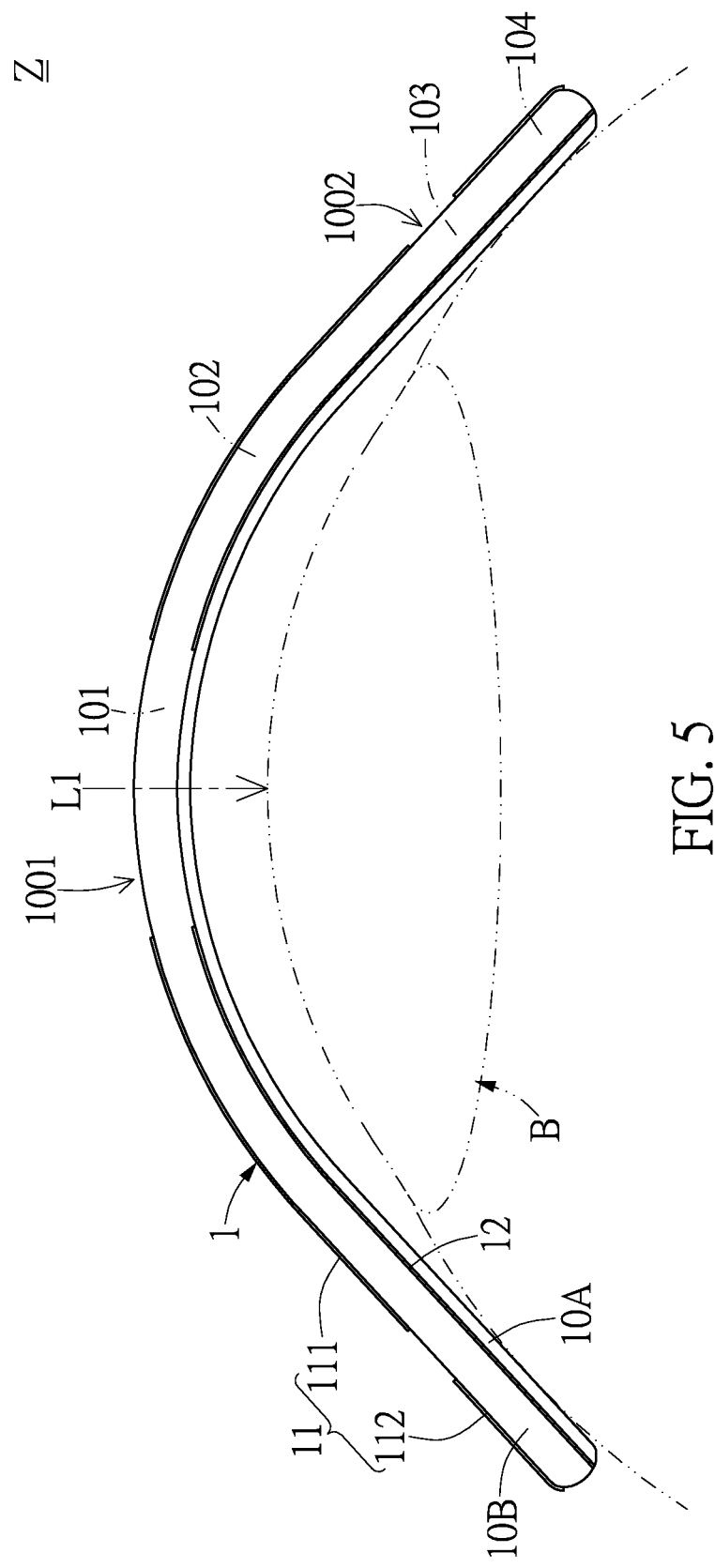
FIG. 5 shows a front schematic view of a light-transmitting body according to a second embodiment of the present disclosure.
Figure 6:
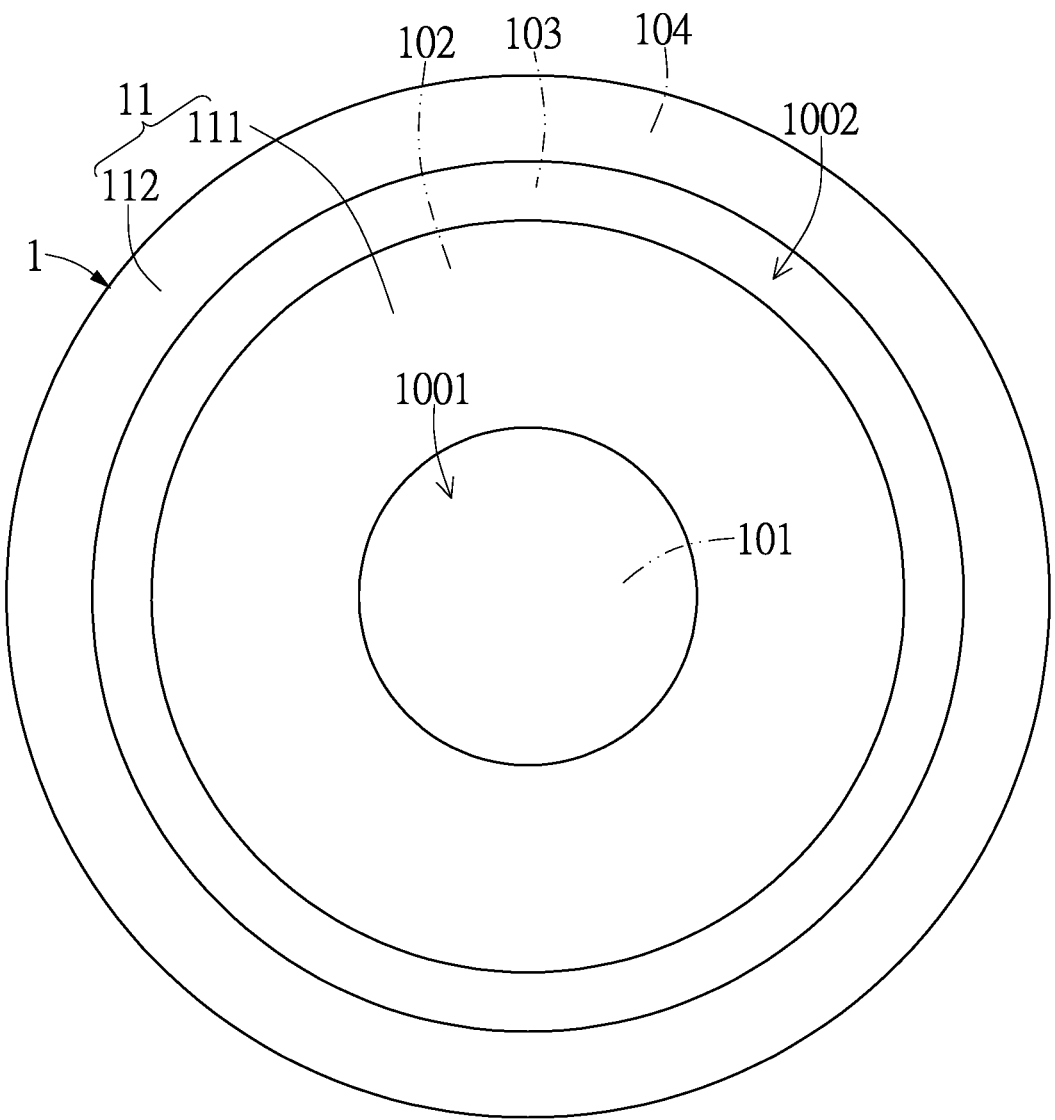
FIG. 6 shows a top schematic view of the light-transmitting body according to the second embodiment of the present disclosure.

Referring to FIG. 5 and FIG. 6, the second embodiment of the present disclosure provides a light-transmitting body 1. Comparing FIG. 5 with FIG. 2, and FIG. 6 with FIG. 3, the difference between the second embodiment and the first embodiment is as follows: in the second embodiment, the light-transmitting body 1 has a first reflective structure 11 and a second reflective structure 12 opposite to the first reflective structure 11.

For example, referring to FIG. 5 and FIG. 6, the first reflective structure 11 has a first outer reflective layer 111 connected between the first view window 1001 and the second view window 1002, and a second outer reflective layer 112 separated from the first outer reflective layer 111 and surrounding the second view window 1002. For example, the first reflective structure 11 and the second reflective structure 12 can be made of any reflective material with retro reflectors, but it is merely an example and is not meant to limit the scope of the present disclosure.

Figure 7:
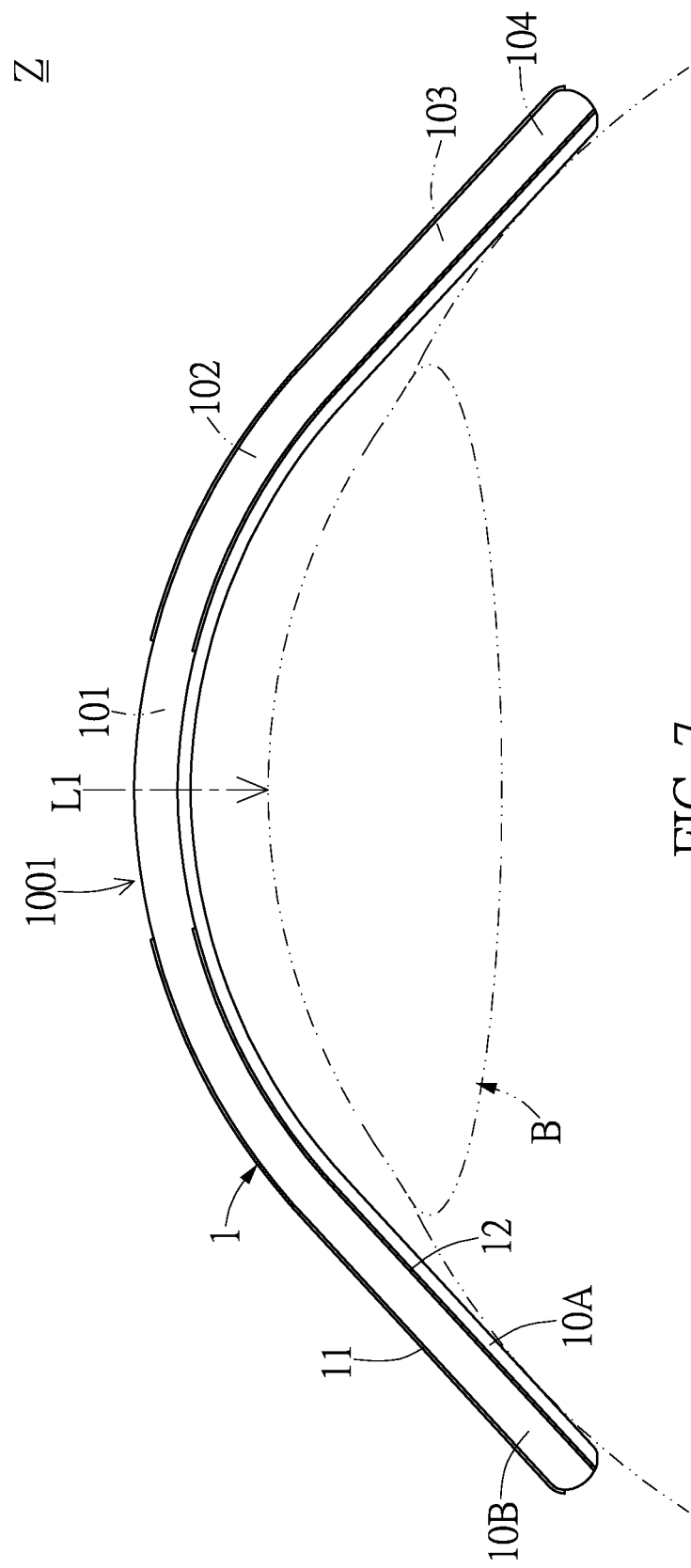
FIG. 7 shows a front schematic view of another light-transmitting body according to the second embodiment of the present disclosure.

It should be noted that the second view window 1002 can be omitted from the light-transmitting body 1 of the first embodiment, and the first view window 1001 can be the only one used as shown in FIG. 7.

Hence, the present disclosure can select one of the light-transmitting bodies 1 for use according to different requirements, as respectively shown in FIG. 2, FIG. 4, FIG. 5 and FIG. 7.

Third Embodiment

Figure 8:
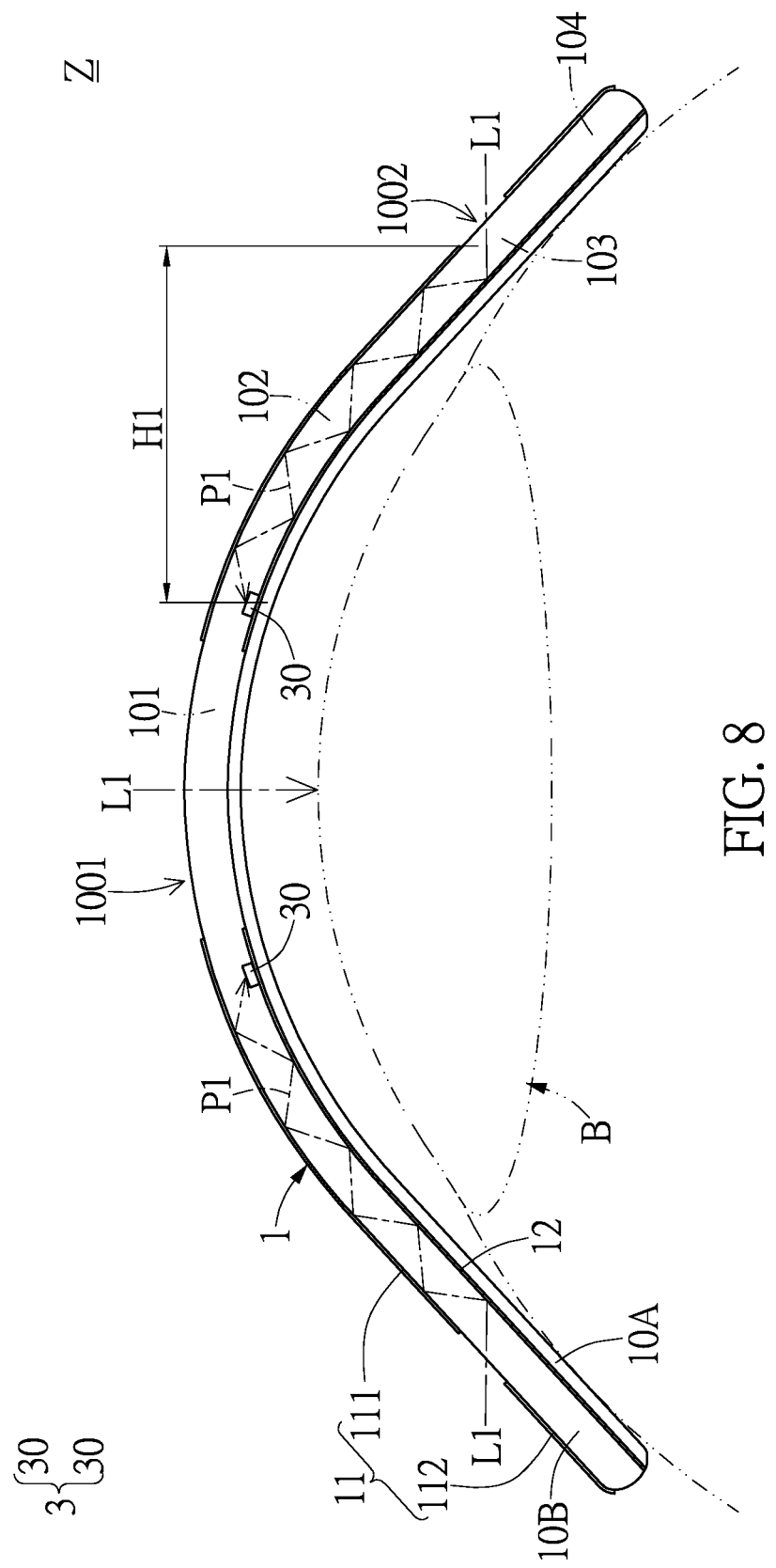
FIG. 8 shows a front schematic view of the smart contact lens according to a third embodiment of the present disclosure.
Figure 9:
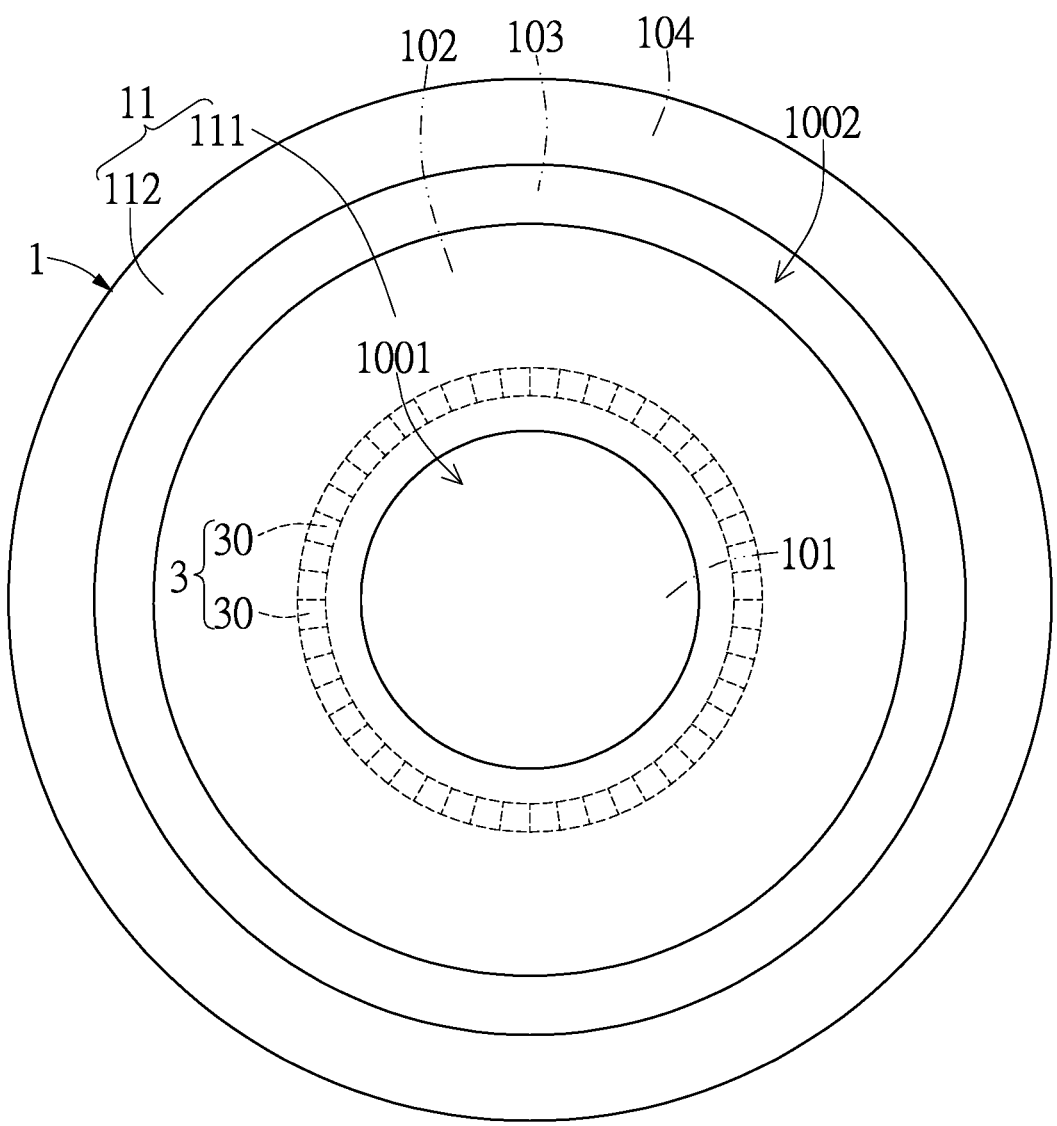
FIG. 9 shows a top schematic view of the smart contact lens according to the third embodiment of the present disclosure.

Referring to FIG. 8 and FIG. 9, the third embodiment of the present disclosure provides a smart contact lens Z with an image-capturing function, including a light-transmitting body 1, a control module (not shown), and an image-sensing module 3.

More particularly, referring to FIG. 1, FIG. 8 and FIG. 9, the light-transmitting body 1 has a first view window 1001 and a second view window 1002 surrounding the first view window 1001, and the control module 2 is received inside the light-transmitting body 1. In addition, the image-sensing module 3 includes a plurality of image-sensing chips 30 received inside the light-transmitting body 1 and electrically connected to the control module 2, and the image-sensing chip 30 diverges (is separated) from the second view window 1002 by a predetermined horizontal distance (such as a first predetermined horizontal distance H1).

More particularly, referring to FIG. 8 and FIG. 9, the light-transmitting body 1 has a transmission path (such as a first transmission path P1) formed in the light-transmitting body 1 and between the second view window 1002 and the image-sensing module 3, and an external image source L1 can be transmitted to the light-transmitting body 1 through the first view window 1001 and the second view window 1002, respectively. In addition, the external image source L1 that has been received by the first view window 1001 can directly pass through the light-transmitting body 1 and then can be projected onto an eyeball B, and the external image source L1 that has been received by the second view window 1002 can be transmitted to the image-sensing chips 30 of the image-sensing module 3 through the first transmission path P1 (that is to say, the external image source L1 can be transmitted along the first transmission path P1).

More particularly, referring to FIG. 8 and FIG. 9, the light-transmitting body 1 has a first reflective structure 11 and a second reflective structure 12 opposite to the first reflective structure 11. In addition, the external image source L1 that has been received by the second view window 1002 can be repeatedly reflected by the first reflective structure 11 and the second reflective structure 12 and then can be transmitted to the image-sensing chips 30 of the image-sensing module 3.

Whereby, referring to FIG. 1 and FIG. 8, the image-sensing module 3 can provide an image signal S1 according to the external image source L1 that has been received by the image-sensing module 3, and the image signal S1 can be transmitted from the image-sensing module 3 to the control module 2. Hence, the control module 2 can provide an information signal S2 according to the image signal S1, and the information signal S2 can be transmitted from the control module 2 to an image display module 4.

For example, referring to FIG. 8 and FIG. 9, the first reflective structure 11 has a first outer reflective layer 111 connected between the first view window 1001 and the second view window 1002, and a second outer reflective layer 112 separated from the first outer reflective layer 111 and surrounding the second view window 1002. In addition, the light-transmitting body 1 has a first light-transmitting portion 101 connected to the first view window 1001, a second light-transmitting portion 102 separated from the first view window 1001 and surroundingly connected to the first light-transmitting portion 101, a third light-transmitting portion 103 connected to the second view window 1002 and surroundingly connected to the second light-transmitting portion 102, and a fourth light-transmitting portion 104 separated from the second view window 1002 and surroundingly connected to the third light-transmitting portion 103. However, it is merely an example and is not meant to limit the scope of the present disclosure.

It should be noted that the image-sensing module 3 can be disposed inside one of the second light-transmitting portion 102 and the fourth light-transmitting portion 104. For example, the image-sensing module 3 is disposed inside the second light-transmitting portion 102 as shown in FIG. 8.

Fourth Embodiment

Figure 10:
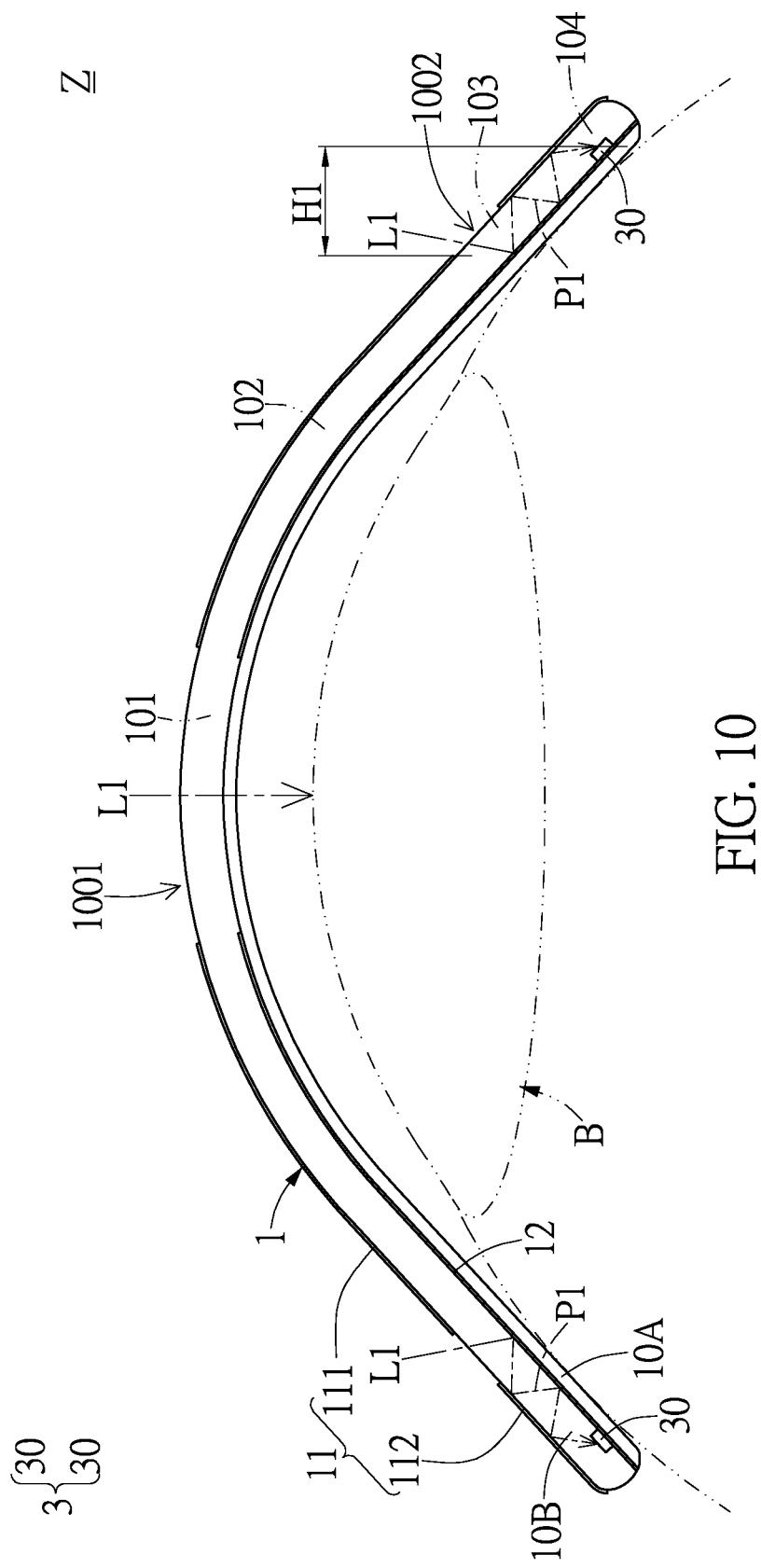
FIG. 10 shows a front schematic view of the smart contact lens according to a fourth embodiment of the present disclosure.

Referring to FIG. 10, the fourth embodiment of the present disclosure provides a smart contact lens Z with an image-capturing function, including a light-transmitting body 1, a control module (not shown), and an image-sensing module 3. Comparing FIG. 10 with FIG. 8, the difference between the fourth embodiment and the third embodiment is as follows: in the fourth embodiment, the image-sensing module 3 is disposed inside the fourth light-transmitting portion 104. That is to say, the image-sensing module 3 can be disposed inside the second light-transmitting portion 102 (as shown in the third embodiment of FIG. 8) or the fourth light-transmitting portion 104 (as shown in the fourth embodiment of FIG. 10) according to different requirements.

Fifth Embodiment

Figure 11:
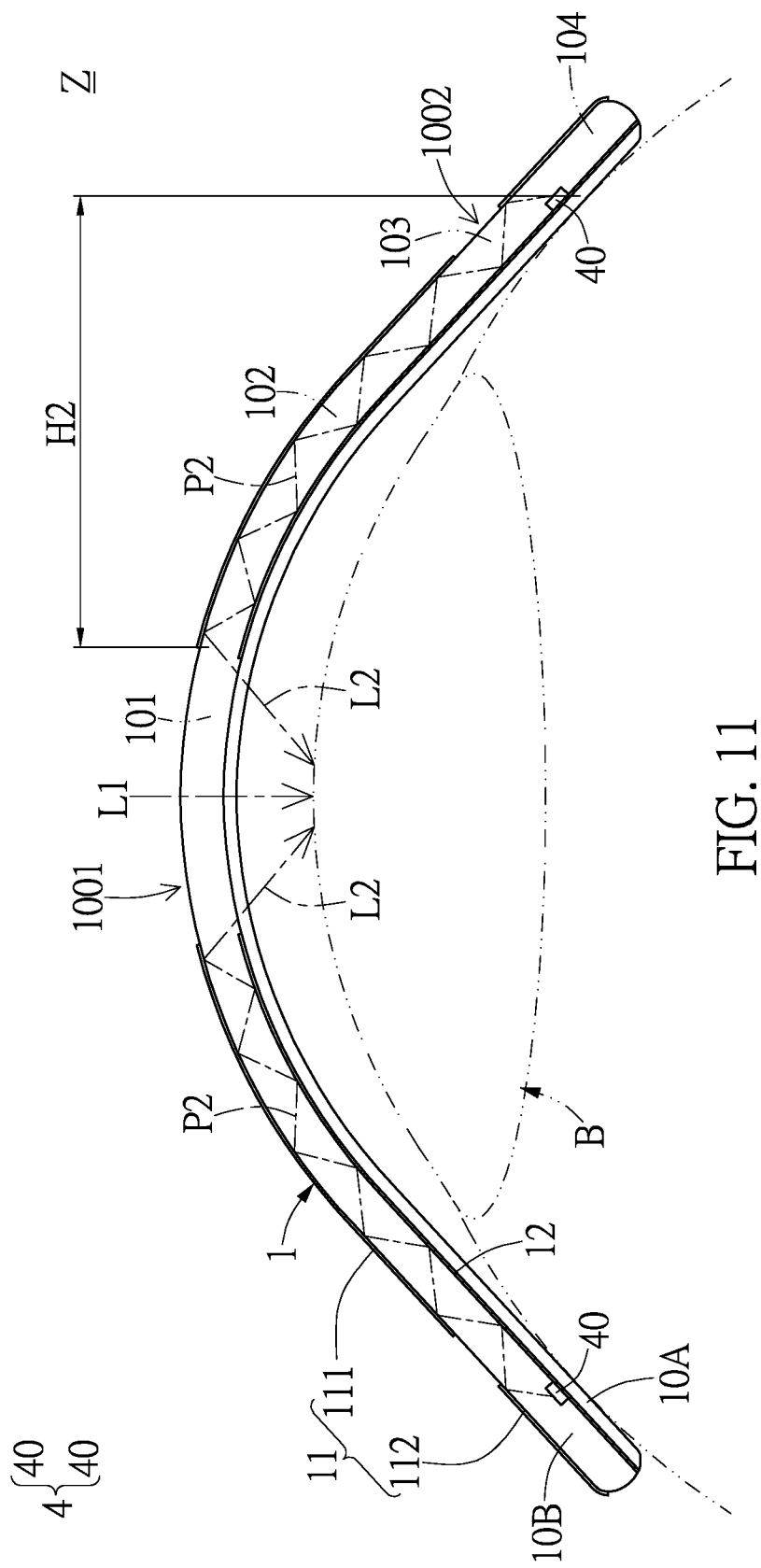
FIG. 11 shows a front schematic view of the smart contact lens according to a fifth embodiment of the present disclosure.
Figure 12:
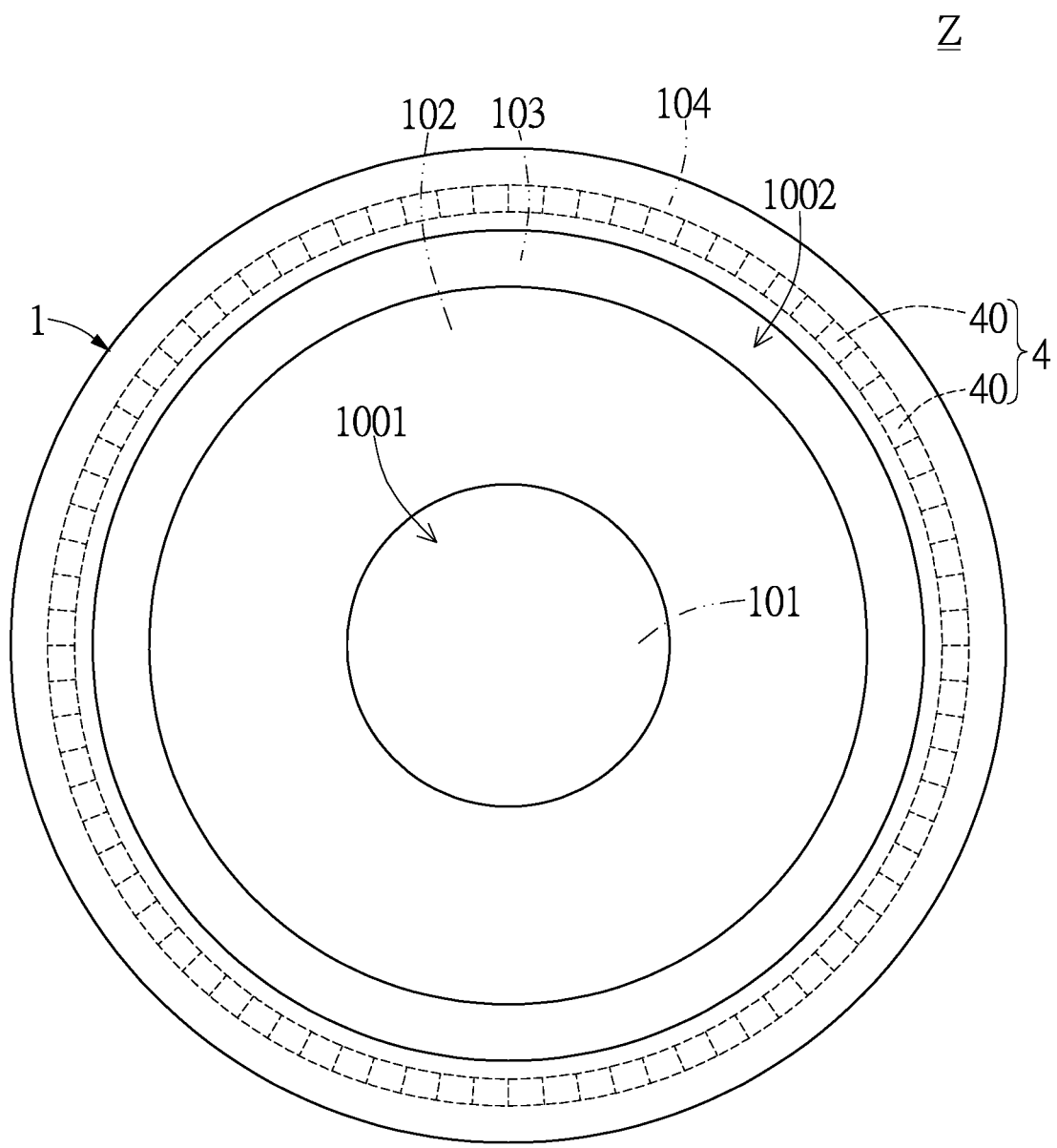
FIG. 12 shows a top schematic view of the smart contact lens according to the fifth embodiment of the present disclosure.

Referring to FIG. 11 and FIG. 12, the fifth embodiment of the present disclosure provides a smart contact lens Z with an image displaying function, including a light-transmitting body 1, a control module (not shown), and an image display module 4.

More particularly, referring to FIG. 1, FIG. 11 and FIG. 12, the light-transmitting body 1 has a view window (such as a first view window 1001), and the control module 2 is received inside the light-transmitting body 1. In addition, the image display module 4 includes a plurality of image display chips 40 received inside the light-transmitting body 1 and electrically connected to the control module 2, and the image display chip 40 diverges from the first view window 1001 by a predetermined horizontal distance (such as a second predetermined horizontal distance H2).

More particularly, referring to FIG. 11 and FIG. 12, the light-transmitting body 1 has a transmission path (such as a second transmission path P2) formed in the light-transmitting body 1 and between the first view window 1001 and the image display module 4, and an external image source L1 is transmitted to the light-transmitting body 1 through the first view window 1001. In addition, the external image source L1 that has been received by the first view window 1001 can directly pass through the light-transmitting body 1 and then be projected onto an eyeball B, and an internal image source L2 generated by cooperation of the image display chips 40 of the image display module 4 can be transmitted to the eyeball B through the second transmission path P2 (that is to say, the internal image source L2 can be transmitted along the second transmission path P2).

More particularly, referring to FIG. 11 and FIG. 12, the light-transmitting body 1 has a first reflective structure 11 and a second reflective structure 12 opposite to the first reflective structure 11. In addition, the internal image source L2 that is generated by cooperation of the image display chips 40 of the image display module 4 can be repeatedly reflected by the first reflective structure 11 and the second reflective structure 12 and then be transmitted to the eyeball B.

Whereby, referring to FIG. 1 and FIG. 11, the control module 2 can provide an information signal S2 according to the image signal S1, and the information signal S2 can be transmitted from the control module 2 to an image display module 4. Therefore, the image display chips 40 of the image display module 4 can cooperate with each other according to the information signal S2 for generating an internal image source L2, and then the internal image source L2 can be transmitted from the image display module 4 to the eyeball B.

For example, referring to FIG. 11 and FIG. 12, the light-transmitting body 1 has a first light-transmitting portion 101 connected to the first view window 1001, a second light-transmitting portion 102 surroundingly connected to the first light-transmitting portion 101, a third light-transmitting portion 103 surroundingly connected to the second light-transmitting portion 102, and a fourth light-transmitting portion 104 surroundingly connected to the third light-transmitting portion 103. However, it is merely an example and is not meant to limit the scope of the present disclosure.

It should be noted that the image display module 4 can be disposed inside one of the second light-transmitting portion 102 and the fourth light-transmitting portion 104. For example, the image display module 4 is disposed inside the fourth light-transmitting portion 104 as shown in FIG. 11.

It should be noted that the light-transmitting body 1 of the fifth embodiment can be replaced by the light-transmitting body 1 of the second embodiment as shown in FIG. 7.

Sixth Embodiment

Figure 13:
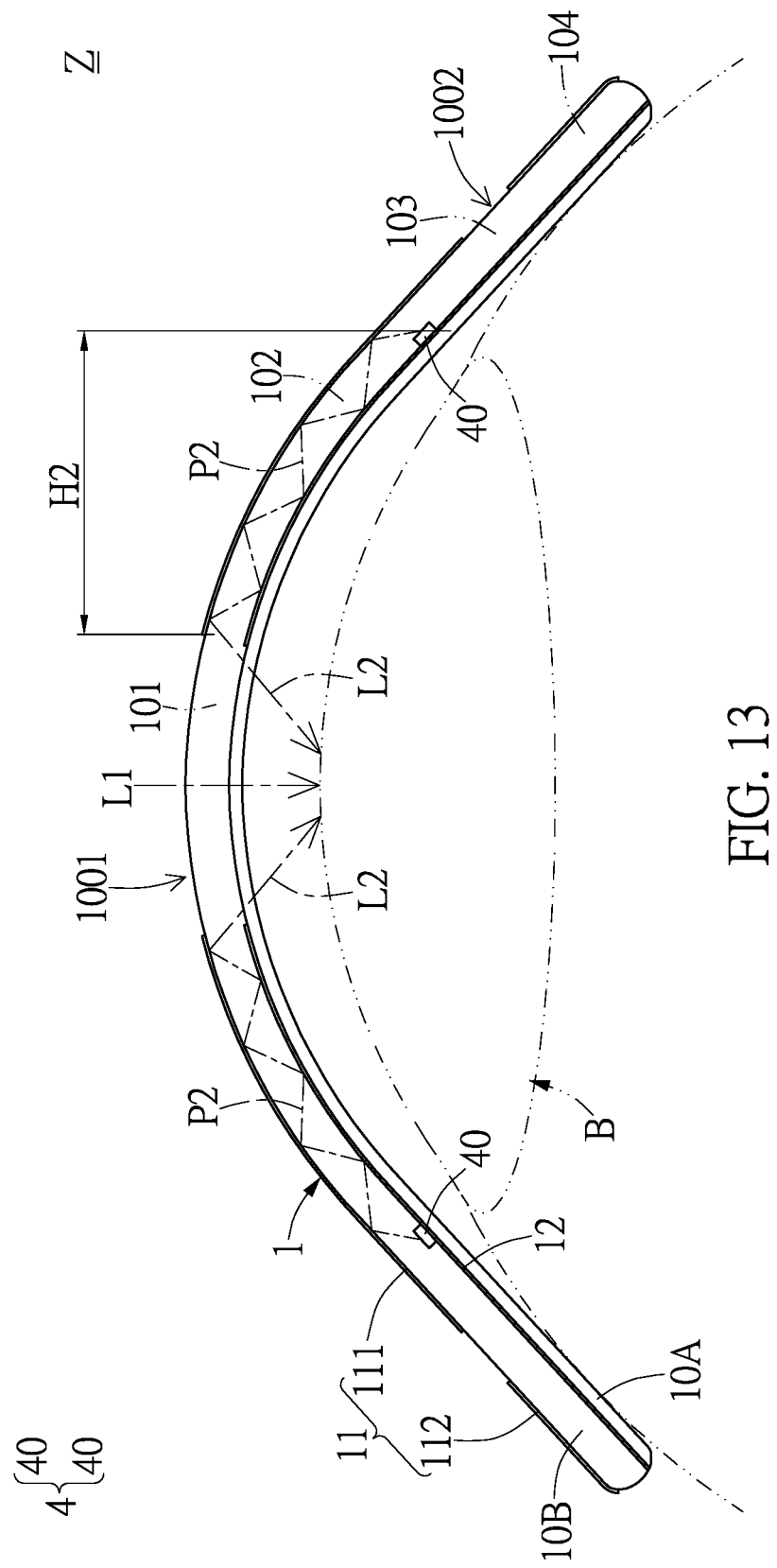
FIG. 13 shows a front schematic view of the smart contact lens according to a sixth embodiment of the present disclosure.

Referring to FIG. 13, the sixth embodiment of the present disclosure provides a smart contact lens Z with an image displaying function, including a light-transmitting body 1, a control module (not shown), and an image display module 4. Comparing FIG. 13 with FIG. 11, the difference between the sixth embodiment and the fifth embodiment is as follows: in the sixth embodiment, the image display module 4 is disposed inside the second light-transmitting portion 102.

That is to say, the image display module 4 can be disposed inside the second light-transmitting portion 102 (as shown in the fifth embodiment of FIG. 11) or the fourth light-transmitting portion 104 (as shown in the sixth embodiment of FIG. 13) according to different requirements.

It should be noted that the light-transmitting body 1 of the sixth embodiment can be replaced by the light-transmitting body 1 of the second embodiment as shown in FIG. 7.

Seventh Embodiment

Figure 14:
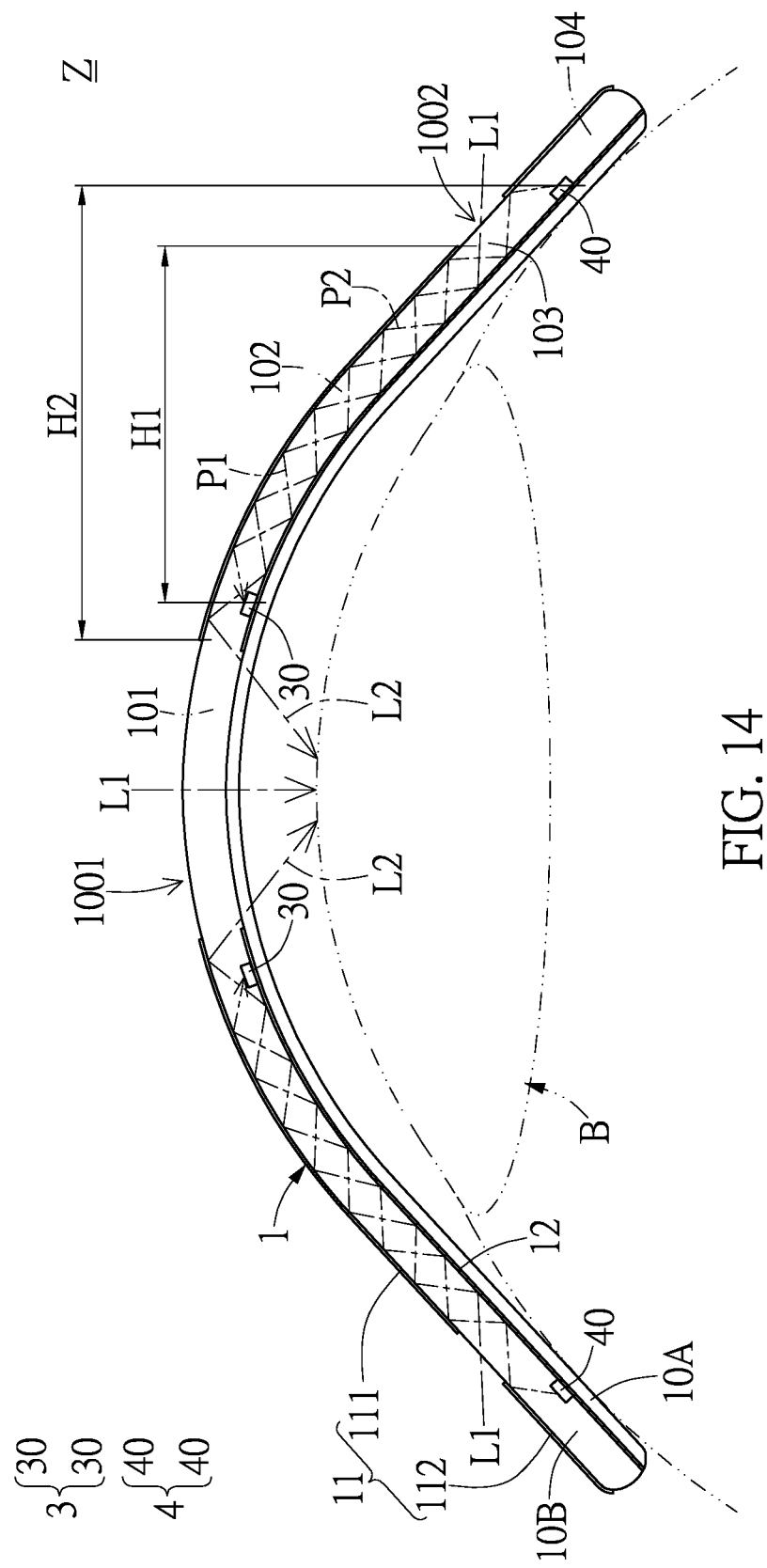
FIG. 14 shows a front schematic view of the smart contact lens according to a seventh embodiment of the present disclosure.
Figure 15:
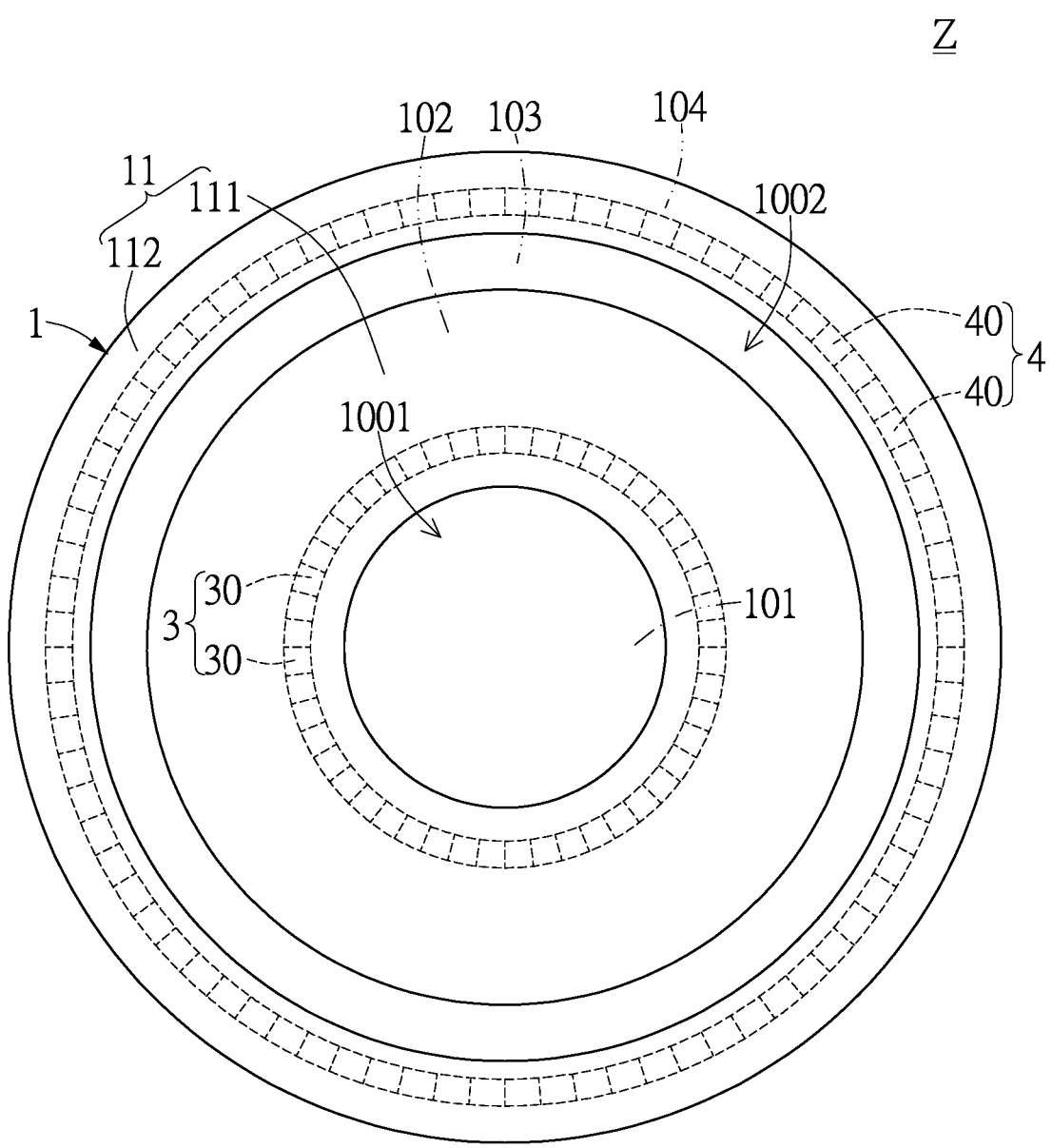
FIG. 15 shows a top schematic view of the smart contact lens according to the seventh embodiment of the present disclosure.

Referring to FIG. 1, FIG. 14 and FIG. 15, the seventh embodiment of the present disclosure provides a smart contact lens Z, including a light-transmitting body 1, a control module 2, an image-sensing module 3, an image display module 4, a wireless transmission module 5, a bio-sensing module 6 and a power supply module 7.

More particularly, referring to FIG. 1, FIG. 14 and FIG. 15, the light-transmitting body 1 has a first view window 1001 and a second view window 1002 surrounding the first view window 1001, and the control module 2 is received inside the light-transmitting body 1. In addition, the image-sensing module 3 includes a plurality of image-sensing chips 30 received inside the light-transmitting body 1 and electrically connected to the control module 2, and the image-sensing chip 30 diverges from the second view window 1002 by a first predetermined horizontal distance H1. Moreover, the image display module 4 includes a plurality of image display chips 40 received inside the light-transmitting body 1 and electrically connected to the control module 2, and the image display chip 40 diverges from the first view window 1001 by a second predetermined horizontal distance H2. Furthermore, the wireless transmission module 5 is received inside the light-transmitting body 1 and electrically connected to the control module 2, the bio-sensing module 6 includes at least one bio sensor chip 60 received inside the light-transmitting body 1 and electrically connected to the control module 2, and the power supply module 7 is received inside the light-transmitting body 1 and electrically connected to the control module 2.

More particularly, referring to FIG. 14 and FIG. 15, the light-transmitting body 1 has a first transmission path P1 and a second transmission path P2. The first transmission path P1 is formed in the light-transmitting body 1 and between the second view window 1002 and the image-sensing module 3, and the second transmission path P2 is formed in the light-transmitting body 1 and between the first view window 1001 and the image display module 4. In addition, an external image source L1 can be transmitted to the light-transmitting body 1 through the first view window 1001 and the second view window 1002 respectively, and the external image source L1 that has been received by the first view window 1001 can directly pass through the light-transmitting body 1 and then be projected onto an eyeball B. Moreover, the external image source L1 that has been received by the second view window 1002 can be transmitted to the image-sensing chips 30 of the image-sensing module 3 through the first transmission path P1, and an internal image source L2 generated by cooperation of the image display chips 40 of the image display module 4 can be transmitted to the eyeball B through the second transmission path P2.

More particularly, referring to FIG. 14 and FIG. 15, the light-transmitting body 1 has a first reflective structure 11 and a second reflective structure 12 opposite to the first reflective structure 11. In addition, the external image source L1 that has been received by the second view window 1002 can be repeatedly reflected by the first reflective structure 11 and the second reflective structure 12 and then be transmitted to the image-sensing chips 30 of the image-sensing module 3, and the internal image source L2 that is generated by cooperation of the image display chips 40 of the image display module 4 can be repeatedly reflected by the first reflective structure 11 and the second reflective structure 12 and then be transmitted to the eyeball B.

Whereby, referring to FIG. 1 and FIG. 14, the image-sensing module 3 can provide an image signal S1 according to the external image source L1 that has been received by the image-sensing module 3, and the image signal S1 can be transmitted from the image-sensing module 3 to the control module 2. Moreover, the control module 2 can provide an information signal S2 according to the image signal S1, and the information signal S2 can be transmitted from the control module 2 to an image display module 4. In addition, the image display chips 40 of the image display module 4 can cooperate with each other according to the information signal S2 for generating an internal image source L2, and then the internal image source L2 can be transmitted from the image display module 4 to the eyeball B.

For example, referring to FIG. 14 and FIG. 15, the light-transmitting body 1 has a first light-transmitting portion 101 connected to the first view window 1001, a second light-transmitting portion 102 surroundingly connected to the first light-transmitting portion 101, a third light-transmitting portion 103 connected to the second view window 1002 and surroundingly connected to the second light-transmitting portion 102, and a fourth light-transmitting portion 104 separated from the second view window 1002 and surroundingly connected to the third light-transmitting portion 103. However, it is merely an example and is not meant to limit the scope of the present disclosure.

It should be noted that the image-sensing module 3 can be disposed inside one of the second light-transmitting portion 102 and the fourth light-transmitting portion 104, and the image display module 4 can be disposed inside one of the second light-transmitting portion 102 and the fourth light-transmitting portion 104. That is to say, the image-sensing module 3 can be disposed inside the second light-transmitting portion 102 (as shown in the third embodiment of FIG. 8) or the fourth light-transmitting portion 104 (as shown in the fourth embodiment of FIG. 10) according to different requirements. In addition, the image display module 4 can be disposed inside the second light-transmitting portion 102 (as shown in the fifth embodiment of FIG. 11) or the fourth light-transmitting portion 104 (as shown in the sixth embodiment of FIG. 13) according to different requirements.

Eighth Embodiment

Figure 16:
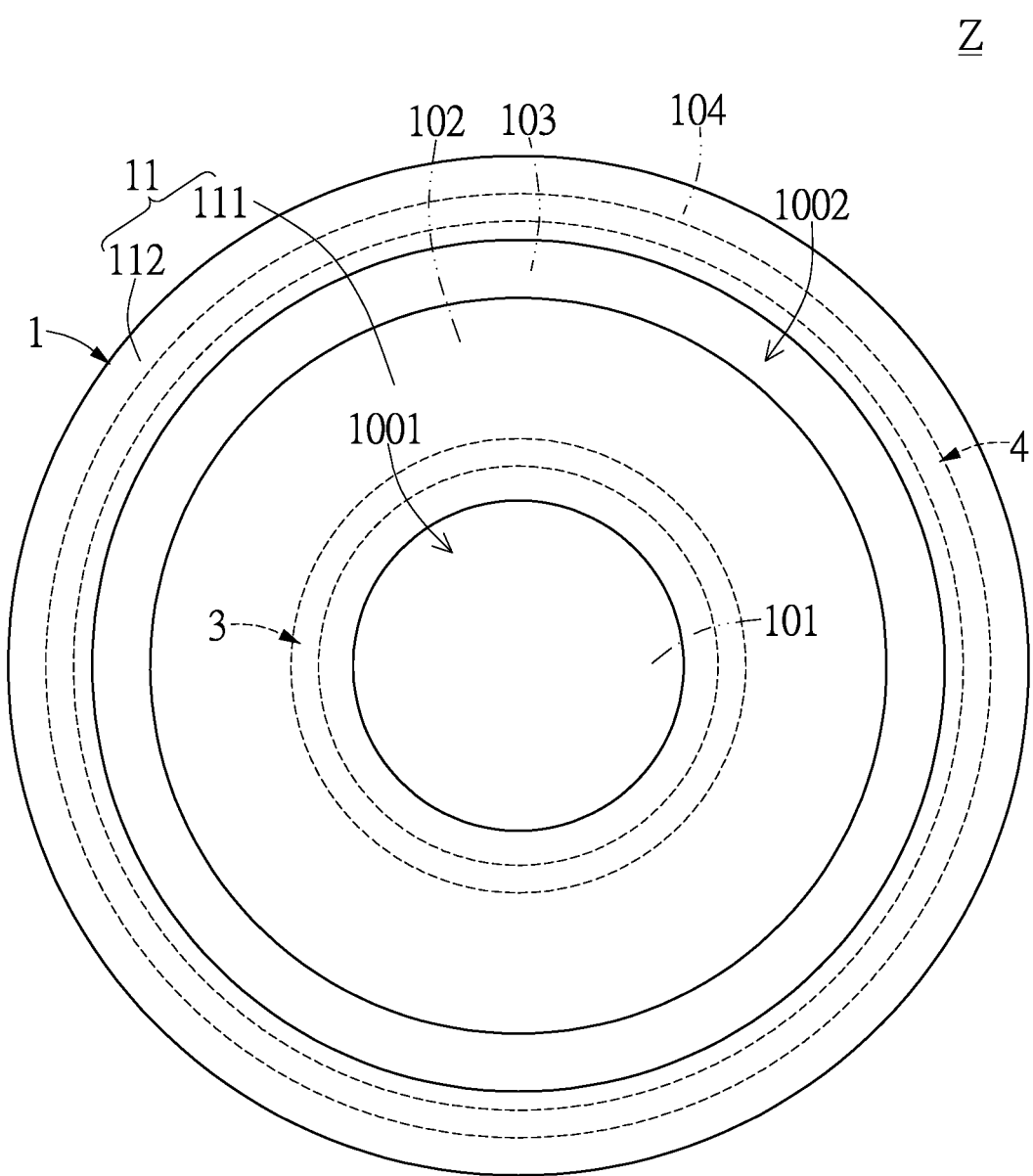
FIG. 16 shows a top schematic view of the smart contact lens according to an eighth embodiment of the present disclosure.

Referring to FIG. 1 and FIG. 16, the eighth embodiment of the present disclosure provides a smart contact lens Z, including a light-transmitting body 1, a control module 2, an image-sensing module 3, an image display module 4, a wireless transmission module 5, a bio-sensing module 6 and a power supply module 7. Comparing FIG. 16 with FIG. 15, the difference between the eighth embodiment and the seventh embodiment is as follows: in the eighth embodiment, the image-sensing module 3 is a single image sensor having an annular sensing area, and the image display module 4 is a single image display having an annular display area.

That is to say, the image-sensing module 3 includes a plurality of image-sensing chips 30 connected one to another or a single image sensor having an annular sensing area, and the image display module 4 includes a plurality of image display chips 40 connected one to another or a single image display having an annular display area.

In conclusion, the external image source L1 that has been received by the second view window 1002 can be transmitted to the image-sensing module 3 through the first transmission path P1, and the internal image source L2 generated by the image display module 4 can be transmitted to an eyeball B through the second transmission path P2 by matching the features of "the light-transmitting body 1 has a first view window 1001 and a second view window 1002" and "the light-transmitting body 1 has a first transmission path P1 formed between the second view window 1002 and the image-sensing module 3, and a second transmission path P2 formed between the first view window 1001 and the image display module 4".

More particularly, the smart contact lens Z can provide a control module 2 having a control function, an image-sensing module 3 having an image-capturing function, an image display module 4 having an image displaying function, a wireless transmission module 5 having a wireless transmission function, a bio-sensing module 6 having a bio-sensing function, or a power supply module 7 having a power supply function by matching the features of "the light-transmitting body 1 is used for totally enclosing one of the control module 2, the image-sensing module 3, the image display module 4, the wireless transmission module 5, the bio-sensing module 6, and the power supply module 7" and "the light-transmitting body 1 has a first view window 1001 and a second view window 1002 surrounding the first view window 1001".

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A smart contact lens, comprising:
a light-transmitting body having a first view window and a second view window surrounding the first view window;
a control module received inside the light-transmitting body;
an image-sensing module including a plurality of image-sensing chips received inside the light-transmitting body and electrically connected to the control module, wherein the image-sensing chip diverges from the second view window by a first predetermined horizontal distance;
an image display module including a plurality of image display chips received inside the light-transmitting body and electrically connected to the control module, wherein the image display chip diverges from the first view window by a second predetermined horizontal distance;

a wireless transmission module received inside the light-transmitting body and electrically connected to the control module;
a bio-sensing module including at least one bio sensor chip received inside the light-transmitting body and electrically connected to the control module; and
a power supply module received inside the light-transmitting body and electrically connected to the control module;
wherein the light-transmitting body has a first transmission path and a second transmission path, the first transmission path is formed in the light-transmitting body and between the second view window and the image-sensing module, the second transmission path is formed in the light-transmitting body and between the first view window and the image display module, and an external image source is transmitted to the light-transmitting body through the first view window and the second view window, respectively;
wherein the external image source that has been received by the first view window directly passes through the light-transmitting body and then is projected onto an eyeball, the external image source that has been received by the second view window is transmitted to the image-sensing chips of the image-sensing module through the first transmission path, and an internal image source generated by cooperation of the image display chips of the image display module is transmitted to the eyeball through the second transmission path.

2. The smart contact lens of claim 1, wherein the image-sensing module provides an image signal according to the external image source that has been received by the image-sensing module, and the image signal is transmitted from the image-sensing module to the control module, wherein the control module provides an information signal according to the image signal, and the information signal is transmitted from the control module to the image display module, wherein the image display chips of the image display module provide the internal image source according to the information signal, and the internal image source is transmitted from the image display module to the eyeball, wherein the image-sensing chips of the image-sensing module are connected one to another, and the image display chips of the image display module are connected one to another.

3. The smart contact lens of claim 1, wherein the light-transmitting body has a first reflective structure and a second reflective structure opposite to the first reflective structure, the external image source that has been received by the second view window is repeatedly reflected by the first reflective structure and the second reflective structure and then is transmitted to the image-sensing chips of the image-sensing module, and the internal image source that is generated by cooperation of the image display chips of the image display module is repeatedly reflected by the first reflective structure and the second reflective structure and then is transmitted to the eyeball, wherein the first reflective structure has a first outer reflective layer connected between the first view window and the second view window, and a second outer reflective layer separated from the first outer reflective layer and surrounding the second view window.

4. The smart contact lens of claim 1, wherein the light-transmitting body has a first light-transmitting portion connected to the first view window, a second light-transmitting portion separated from the first view window and surroundingly connected to the first light-transmitting portion, a third light-transmitting portion connected to the second view window and surroundingly connected to the second light-transmitting portion, and a fourth light-transmitting portion separated from the second view window and surroundingly connected to the third light-transmitting portion, wherein the image-sensing module is disposed inside one of the second light-transmitting portion and the fourth light-transmitting portion, and the image display module is disposed inside one of the second light-transmitting portion and the fourth light-transmitting portion.

5. A light-transmitting body for totally enclosing one of a control module, an image-sensing module, an image display module, a wireless transmission module, a bio-sensing module, and a power supply module;
wherein the light-transmitting body has a first view window and a second view window surrounding the first view window, and an external image source that has been received by the first view window directly passes through the light-transmitting body and then is projected onto an eyeball;
wherein the light-transmitting body has a first light-transmitting portion connected to the first view window, a second light-transmitting portion surroundingly connected to the first light-transmitting portion, a third light-transmitting portion connected to the second view window and surroundingly connected to the second light-transmitting portion, and a fourth light-transmitting portion surroundingly connected to the third light-transmitting portion.

6. The light-transmitting body of claim 5, further comprising: a first light-transmitting layer and a second light-transmitting layer, wherein the first light-transmitting layer is attached to the eyeball, and the second light-transmitting layer is disposed on the first light-transmitting layer, wherein one of the control module, the image-sensing module, the image display module, the wireless transmission module, the bio-sensing module, and the power supply module is enclosed between the first light-transmitting layer and the second light-transmitting layer, and both the first view window and the second view window are disposed on the second light-transmitting layer.

7. A smart contact lens, comprising:
a light-transmitting body having a first view window and a second view window;
a control module received inside the light-transmitting body;
an image-sensing module received inside the light-transmitting body and electrically connected to the control module, wherein the image-sensing module diverges from the second view window by a first predetermined horizontal distance;
an image display module received inside the light-transmitting body and electrically connected to the control module, wherein the image display module diverges from the first view window by a second predetermined horizontal distance;
a wireless transmission module received inside the light-transmitting body and electrically connected to the control module;
a bio-sensing module received inside the light-transmitting body and electrically connected to the control module; and
a power supply module received inside the light-transmitting body and electrically connected to the control module;
wherein the light-transmitting body has a first transmission path and a second transmission path, the first transmission path is formed in the light-transmitting body and between the second view window and the image-sensing module, and the second transmission path is formed in the light-transmitting body and between the first view window and the image display module;

wherein an external image source that has been received by the second view window is transmitted to the image-sensing module through the first transmission path, and an internal image source generated by the image display module is transmitted to an eyeball through the second transmission path.

8. The smart contact lens of claim 7, wherein the image-sensing module provides an image signal according to the external image source that has been received by the image-sensing module, and the image signal is transmitted from the image-sensing module to the control module, wherein the control module provides an information signal according to the image signal, and the information signal is transmitted from the control module to the image display module, wherein the image display module provides the internal image source according to the information signal, and the internal image source is transmitted from the image display module to the eyeball.

9. The smart contact lens of claim 7, wherein the light-transmitting body has a first reflective structure and a second reflective structure opposite to the first reflective structure, the external image source that has been received by the second view window is repeatedly reflected by the first reflective structure and the second reflective structure and then is transmitted to the image-sensing module, and the internal image source that is generated by the image display module is repeatedly reflected by the first reflective structure and the second reflective structure and then is transmitted to the eyeball, wherein the first reflective structure has a first outer reflective layer connected between the first view window and the second view window, and a second outer reflective layer separated from the first outer reflective layer and surrounding the second view window.

10. The smart contact lens of claim 7, wherein the light-transmitting body has a first light-transmitting portion connected to the first view window, a second light-transmitting portion separated from the first view window and surroundingly connected to the first light-transmitting portion, a third light-transmitting portion connected to the second view window and surroundingly connected to the second light-transmitting portion, and a fourth light-transmitting portion separated from the second view window and surroundingly connected to the third light-transmitting portion, wherein the image-sensing module is disposed inside one of the second light-transmitting portion and the fourth light-transmitting portion, and the image display module is disposed inside one of the second light-transmitting portion and the fourth light-transmitting portion.

* * * * *